US012381666B2

(12) United States Patent
Kim et al.

(10) Patent No.: US 12,381,666 B2
(45) Date of Patent: Aug. 5, 2025

(54) METHOD FOR ESTIMATING BIT ERROR PROBABILITY USING ERROR RATE RATIO OF FRAME SYNCHRONIZATION WORD

(71) Applicant: KOREA AEROSPACE RESEARCH INSTITUTE, Daejeon (KR)

(72) Inventors: Seokkwon Kim, Daejeon (KR); Sung Wan Kim, Daejeon (KR); Keunsu Ma, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 18/255,555

(22) PCT Filed: Oct. 1, 2021

(86) PCT No.: PCT/KR2021/013474
§ 371 (c)(1),
(2) Date: Jun. 1, 2023

(87) PCT Pub. No.: WO2022/119092
PCT Pub. Date: Jun. 9, 2022

(65) Prior Publication Data
US 2024/0014953 A1  Jan. 11, 2024

(30) Foreign Application Priority Data
Dec. 4, 2020 (KR) ........................ 10-2020-0168153

(51) Int. Cl.
*H04L 1/20* (2006.01)
*H04L 7/04* (2006.01)

(52) U.S. Cl.
CPC .............. *H04L 1/203* (2013.01); *H04L 7/048* (2013.01)

(58) Field of Classification Search
None
See application file for complete search history.

(56) References Cited

U.S. PATENT DOCUMENTS 6,834,109 B1 * 12/2004 Pare, Jr. ............ H04L 25/03305
                                              375/284
10,749,661 B1 * 8/2020 Visani ..................... H04L 1/205
(Continued)

FOREIGN PATENT DOCUMENTS

| KR | 20010011331 A | 2/2001 |
| KR | 100805814 B1 | 2/2008 |
| KR | 101014474 B1 | 2/2011 |

OTHER PUBLICATIONS

C. Rohde, "Estimation of Bit Probability of Error Using Sync Word Error Rate Data," in IEEE Transactions on Communication Technology, vol. 18, No. 6, pp. 811-814, Dec. 1970, (Year: 1970).*

(Continued)

*Primary Examiner* — Daniel F. McMahon
(74) *Attorney, Agent, or Firm* — McCoy Russell LLP (57) ABSTRACT

The present invention relates to a method for estimating a bit error probability using an error rate ratio of a frame synchronization word. The method comprises the steps of a) defining error rate ratios of frame synchronization words, b) setting a cost function $f(p_e)$ in a weighted least squares (WLS) form, c) obtaining a value of $\gamma$, and d) deriving an estimated bit error probability value $\widehat{p_e}$.

5 Claims, 4 Drawing Sheets

(56) References Cited

U.S. PATENT DOCUMENTS

| | | | | |
|---|---|---|---|---|
| 2004/0001564 A1* | 1/2004 | Chan | .................. | H04L 27/38 |
| | | | | 375/341 |
| 2010/0203839 A1* | 8/2010 | Duan | .................. | H04B 17/318 |
| | | | | 455/67.11 |
| 2017/0185901 A1* | 6/2017 | Farahat | .................. | H04L 67/535 |
| 2017/0353345 A1* | 12/2017 | Grigoryan | .................. | H04L 41/0677 |
| 2018/0145859 A1* | 5/2018 | Xu | .................. | H04L 27/2618 |
| 2019/0289296 A1* | 9/2019 | Kottke | .................. | H04N 19/179 |
| 2021/0081270 A1* | 3/2021 | Abbaszadeh | .................. | G06F 18/295 |
| 2022/0373638 A1* | 11/2022 | Chrabieh | .................. | H04L 5/0051 |

OTHER PUBLICATIONS

M. Rice and E. Gagakuma, "Approximate MLSE Equalization of SOQPSK-TG in Aeronautical Telemetry," in IEEE Transactions on Aerospace and Electronic Systems, vol. 55, No. 2, pp. 769-784, Apr. 2019, (Year: 2019).*

Williams, I. et al., "Linear Frequency Domain Equalization of SOQPSK-TG for Wideband Aeronautical Telemetry Channels," IEEE Transactions on Aerospace and Electronic Systems, vol. 49, No. 1, Jan. 8, 2013, 8 pages.

"Document 106-19 Telemetry Standards," IRIG Website, Available Online at http://www.irig106.org/docs/106-19/106-19_Telemetry_Standards.pdf, Jul. 2019, 1173 pages.

ISA Korean Intellectual Property Office, International Search Report Issued in Application No. PCT/KR2021/013474, Oct. 5, 2022, WIPO, 6 pages.

* cited by examiner

METHOD FOR ESTIMATING BIT ERROR PROBABILITY USING ERROR RATE RATIO OF FRAME SYNCHRONIZATION WORD

CROSS REFERENCE TO RELATED APPLICATIONS

The present application is a U.S. National Phase of International Application No. PCT/KR2021/013474 entitled "METHOD FOR ESTIMATING BIT ERROR PROBABILITY USING ERROR RATE RATIO OF FRAME SYNCHRONIZATION WORD," and filed on Oct. 1, 2021. International Application No. PCT/KR2021/013474 claims priority to Korean Patent Application No. 10-2020-0168153 filed on Dec. 4, 2020. The entire contents of each of the above-listed applications are hereby incorporated by reference for all purposes.

TECHNICAL FIELD

The present invention relates to a method for estimating a bit error probability of frame data using an error rate ratio of a frame synchronization word in the field of communication.

BACKGROUND AND SUMMARY

Telemetry is a technology for performing various observations about status of health and the like using sensors at points away from observation targets and acquiring data therefrom. The telemetry is used when there is a physical, economic, or safety problem in staying at an observation point or when an observation target is moving, and the term "telemetering" is also used.

A telemetry encoder may generate data in frame units, and a header of each unit frame may include a frame synchronization word (frame syncword FS) for frame synchronization. The frame synchronization word may be referred to as another term such as a frame synchronization pattern or a preamble.

The frame synchronization word is a string of consecutive and fixed bits, and a length M of a frame synchronization word is given in the range of 16 to 33 bits according to inter-range instrumentation group (TRIG) 106, which is a standard in aeronautical telemetry. TRIG 106 suggests a frame synchronization word recommended with respect to a length M of a frame synchronization word. For example, when the length M of the frame synchronization word is 20, the frame synchronization word is a bit string of "11101101111000100000".

Data processing device may perform a frame synchronization process of finding a starting point of a frame in a received bit stream using the frame synchronization word. In communication, data may have an error due to signal attenuation, distortion, noise, or the like. The data processing device may be set to allow bit errors in a frame synchronization word within a predetermined tolerance in order to improve synchronizing performance. For example, if the error tolerance is set to 2, when a bit string is different from a predefined frame synchronization word in 2 bits or less, the data processing device recognizes the bit string as the frame synchronization word. However, when a bit string is different from a predefined frame synchronization word beyond the error tolerance, the bit string is not recognized as the frame synchronization word.

If a bit error allowable tolerance of a frame synchronization word set in the data processing device is K, the data processing device may figure out the numbers $n_0, \ldots n_K$ of frames of which frame synchronization words each have 0 bit error, . . . , and K bit errors. In addition, the data processing device may figure out the number $n_{K+1}$ of frames each having a frame synchronization word in which the number of bit errors exceeds K. When the total number of received frames is denoted by N, $n_0+n_1 \ldots +n_{K+1}=N$.

In communication, a bit error probability (BEP) is an important measure of data quality. In order to estimate a bit error probability of frame data, frame synchronization word error information may be used. When the bit error probability is denoted by $p_e$, a probability that a frame synchronization word having a length of M bits has k bit errors (k=0, 1, 2, . . . , K) may be expressed as the following Equation a:

$$P(k) = \binom{M}{k} p_e^k (1-p_e)^{M-k}. \quad \text{[Equation a]}$$

Here, $$\binom{M}{k} = \frac{M!}{(M-k)!\,k!},$$

which is a combination formula. (•)! denotes a factorial, and $M!=M\times(M-1) \ldots \times 1$ According to Equation a, $P(0)=(1-p_e)^M$, $P(1)=M\times p_e\times(1-p_e)$, and the like.

A probability that the number of bit errors in a frame synchronization word exceeds K, which denotes an allowable tolerance, may be expressed as the following Equation b:

$$P(K+1) = \sum_{k=K+1}^{M} \binom{M}{k} p_e^k (1-p_e)^{M-k} = 1 - \sum_{k=0}^{K} P(k). \quad \text{[Equation b]}$$

Using the information about $n_0, \ldots n_{K+1}$ and $P(0), \ldots, P(K+1)$ of Equations a and b, a likelihood function L is given as a multinomial distribution as shown in the following Equation c:

$$L(p_e, n_0, \ldots, n_{K+1}) = \\ \frac{N!}{n_0!\,n_1!\,\ldots\,n_{K+1}!} P(0)^{n_0} P(1)^{n_1} \ldots P(K+1)^{n_{K+1}}. \quad \text{[Equation c]}$$

Finding $p_e$ at which the likelihood function is maximum when $n_0, \ldots n_K$ and $n_{K+1}$ are given and estimating $p_e$ as a bit error probability is called a maximum likelihood estimator (MLE), and the maximum likelihood estimator is a representative technique among point estimators. When an estimator of the bit error probability $p_e$ is denoted by $\widehat{p}_e$, a mean squared error (MSE) of the estimator may be expressed as shown in the following Equation d:

$$\text{MSE}(\widehat{p}_e) = E[(\widehat{p}_e - p_e)^2] \quad \text{[Equation d]}$$

(where E[•] denotes an expected value).

The maximum likelihood estimator is known to have a good mean squared error characteristic. The maximum likelihood estimator may be obtained by differentiating the likelihood function of Equation c with respect to $p_e$. When $n_{K+1}$ is 0, $n_{K+1}$ denoting the number of frames each having a frame synchronization word which has a length of M bits and in which the number of bit errors exceeds the allowable tolerance K, an estimator of bit error probability obtained by the maximum likelihood estimation method may be expressed as the following Equation e:

$$\hat{p_e} = \frac{\sum_{k=1}^{K} k \times n_k}{M \times N}.$$ [Equation e]

The denominator M×N of Equation e is equal to the total number of bits of received frame synchronization words, and the numerator $$\sum_{k=1}^{K} k \times n_k$$

of Equation e is equal to the total number of bit errors of the frame synchronization words.

When K, which denotes a bit error allowable tolerance of a frame synchronization word, is 0, an estimator of bit error probability obtained by the maximum likelihood estimation method may be expressed as the following Equation f:

$$\hat{p_e} = 1 - (n_0/N)^{1/M}.$$ [Equation f]

Except when $n_{K+1}=0$ or K=0, a maximum likelihood estimator is generally not given mathematically. In order to improve the frame synchronizing performance of the data processing device, K, which denotes a bit error allowable tolerance of a frame synchronization word, may be set to a value greater than 0, and $n_{K+1}$, which denotes the number of frames each having a frame synchronization word in which the number of bit errors exceeds the allowable tolerance K, may be greater than 0. In this case, the maximum likelihood estimation method has a problem in that computational complexity increases because it is necessary to find a value at which the likelihood function becomes maximum through numerical analysis.

DISCLOSURE

Technical Problem

An object of the present invention is to provide a method for estimating a bit error probability using an error rate ratio of a frame synchronization word to lower computational complexity such that the method can be implemented in a relatively simple and economical way at a high computational speed.

Technical Solution

In one general aspect, a method for estimating a bit error probability using an error rate ratio of a frame synchronization word includes the steps of: a) defining error rate ratios of frame synchronization words; b) setting a weighted least squares (WLS) cost function with weights greater than or equal to 0 for the bit error probability using the error rate ratios of the frame synchronization words set in the step a); c) obtaining an estimated bit error probability value that minimizes the cost function set in the step b); and d) sequentially obtaining the weights so that a mean squared error of the estimated bit error probability value obtained in the step c) becomes small.

In the step a), the error rate ratios, and $\zeta_0, \zeta_1, \ldots, \zeta_{K-1}$ of the frame synchronization words may be defined as shown in the following Equation 1:

$$\zeta_k = \frac{n_{k+1}}{n_k}$$ [Equation 1]

where $n_k$ denotes the number of frames each having a frame synchronization word in which the number of bit errors is k, and K denotes a bit error allowable tolerance of a frame synchronization word having a length of M bits.

In the step b), the WLS cost function $f(p_e)$ with the weights $w_0, \ldots,$ and $w_{K-1}$ as shown in the following Equation 4 may be set using the error rate ratios set through the Equation 1:

$$f(p_e) = \sum_{k=0}^{K-1} w_k \times \left(\frac{\zeta_k}{c_k} - \gamma\right)^2$$ [Equation 4]

where a constant $c_k$ is defined by the following Equation 3-2, and $\gamma$ is defined by the following Equation 3-3, $$c_k = \frac{M-k}{k+1}$$ [Equation 3-2]

$$\gamma = \frac{p_e}{1-p_e},$$ [Equation 3-3]

$$p_e = \frac{\gamma}{1+\gamma}.$$

In the step c), values of $\gamma$ and $p_e$ that minimize the cost function $f(p_e)$ be obtained through the following Equations 5-1 and 5-2:

$$\hat{\gamma} = \frac{\sum_{k=0}^{K-1} w_k \zeta_k / c_k}{\sum_{k=0}^{K-1} w_k},$$ [Equation 5-1]

where $\hat{\gamma}$ denotes an estimated value of the value of $\gamma$ that minimizes $f(p_e)$ of the Equation 4, $$\hat{p_e} = \frac{\hat{\gamma}}{\hat{\gamma}+1} = \frac{\sum_{k=0}^{K-1} w_k \zeta_k / c_k}{\sum_{k=0}^{K-1} w_k \zeta_k / c_k + w_k}.$$ [Equation 5-2]

In the step d), the weights $w_0, \ldots,$ and $w_{K-1}$ may be sequentially obtained so that the mean squared error of $\hat{p_e}$ becomes small.

In the step d), the bit error probability may be estimated in a different manner depending on a value of K, which denotes a bit error allowable tolerance of a frame synchronization word, while $w_0$ is set to 1.

In the step d), when a value of $n_{K+1}$ which denotes the number of frames each having a frame synchronization word in which the number of bit errors exceeds the allowable tolerance K, is not 0, and the value of K, which denotes a bit error allowable tolerance of a frame synchronization word, is 1, the estimated bit error probability value $\hat{p}_e$ may be obtained through the following Equation 6:

$$c_0 = M, \zeta_0 = n_1/n_0 \quad \text{[Equation 6]}$$

$$\hat{\gamma}_0 = \zeta_0/c_0, \hat{p}_e = \hat{\gamma}_0/(\hat{\gamma}_0 + 1).$$

In the step d), when a value of $n_{K+1}$ which denotes the number of frames each having a frame synchronization word in which the number of bit errors exceeds the allowable tolerance K, is not 0, and the value of K, which denotes a bit error allowable tolerance of a frame synchronization word, is 2, the estimated bit error probability value $\hat{p}_e$ may be obtained through the following Equation 7:

$$\begin{aligned}
c_0 &= M, \quad \text{[Equation 7]}\\
c_1 &= (M-1)/2,\\
\zeta_0 &= n_1/n_0,\\
\zeta_1 &= n_2/n_1\\
\hat{\gamma}_a &= \zeta_0/c_0,\\
\hat{w}_1 &= \frac{c_1\hat{\gamma}_a(c_0\hat{\gamma}_a + 2)}{2c_1\hat{\gamma}_a + 1}\\
\hat{\gamma}_1 &= \frac{\zeta_0/c_0 + \hat{w}_1\zeta_1/c_1}{1 + \hat{w}_1},\\
\hat{p}_e &= \hat{\gamma}_1/(\hat{\gamma}_1 + 1)
\end{aligned}$$

where, when the number $n_1$ of frames of which frame synchronization words each have 1 bit error is 0, the error rate ratio $$\zeta_1 = \frac{n_2}{n_1}$$

is not defined, and the weight $\hat{w}_1$ is set to 0 and $\hat{w}_1 \zeta_1/c_1$ is calculated as 0 in the Equation 7.

In the step d), when a value of $n_{K+1}$ which denotes the number of frames each having a frame synchronization word in which the number of bit errors exceeds the allowable tolerance K, is not 0, and the value of K, which denotes a bit error allowable tolerance of a frame synchronization word, is 3, the estimated bit error probability value $\hat{p}_e$ may be obtained through the following Equation 8:

$$\begin{aligned}
c_0 &= M, \quad \text{[Equation 8]}\\
c_1 &= (M-1)/2,\\
c_2 &= (M-2)/3,\\
\zeta_0 &= n_1/n_0,\\
\zeta_1 &= n_2/n_1,\\
\zeta_2 &= n_3/n_1\\
\hat{\gamma}_a &= \zeta_0/c_0,\\
\hat{w}_1 &= \frac{c_1\hat{\gamma}_a(c_0\hat{\gamma}_a + 2)}{2c_1\hat{\gamma}_a + 1}\\
\hat{\gamma}_1 &= \frac{\zeta_0/c_0 + \hat{w}_1\zeta_1/c_1}{1 + \hat{w}_1},\\
\hat{w}_2 &= \frac{c_2\hat{\gamma}_1\{c_0c_1\hat{\gamma}_1^2 + c_1\hat{\gamma}_1(1-\hat{w}_1)^2 + 2\hat{w}_1^2 + \hat{w}_1\}}{(c_2\hat{\gamma}_1 + 1) + (2c_2\hat{\gamma}_1 + 1)\hat{w}_1}\\
\hat{\gamma}_2 &= \frac{\zeta_0/c_0 + \hat{w}_1\zeta_1/c_1 + \hat{w}_2\zeta_2/c_2}{1 + \hat{w}_1 + \hat{w}_2},\\
\hat{p}_e &= \hat{\gamma}_2/(\hat{\gamma}_2 + 1)
\end{aligned}$$

where, when the number $n_1$ of frames of which frame synchronization words each have 1 bit error is 0, the error rate ratio $$\zeta_1 = \frac{n_2}{n_1}$$

is not defined, and the weight $\hat{w}_1$ is set to 0 and $\hat{w}_1 \zeta_1/c_1$ is calculated as 0 in the Equation 8, and when the number $n_2$ of frames of which frame synchronization words each have 2 bit errors is 0, the error rate ratio $$\zeta_2 = \frac{n_3}{n_2}$$

is not defined, and the weight $\hat{w}_2$ is set to 0 and $\hat{w}_2 \zeta_2/c_2$ is calculated as 0 in the Equation 8.

Advantageous Effects

According to the method for estimating a bit error probability using an error rate ratio of a frame synchronization word according to the present invention as described above, a computation amount in the method proposed by the present invention is significantly smaller than that in the conventionally used maximum likelihood estimator, while a mean squared error in the method proposed by the present invention is slightly larger than that in the conventionally used maximum likelihood estimator. As a result, a device to which the method according to the present invention is applied can be implemented in a simpler and more economical way, and the device produced in this way is capable of performing computations at a high speed.

DETAILED DESCRIPTION

Figure 1:
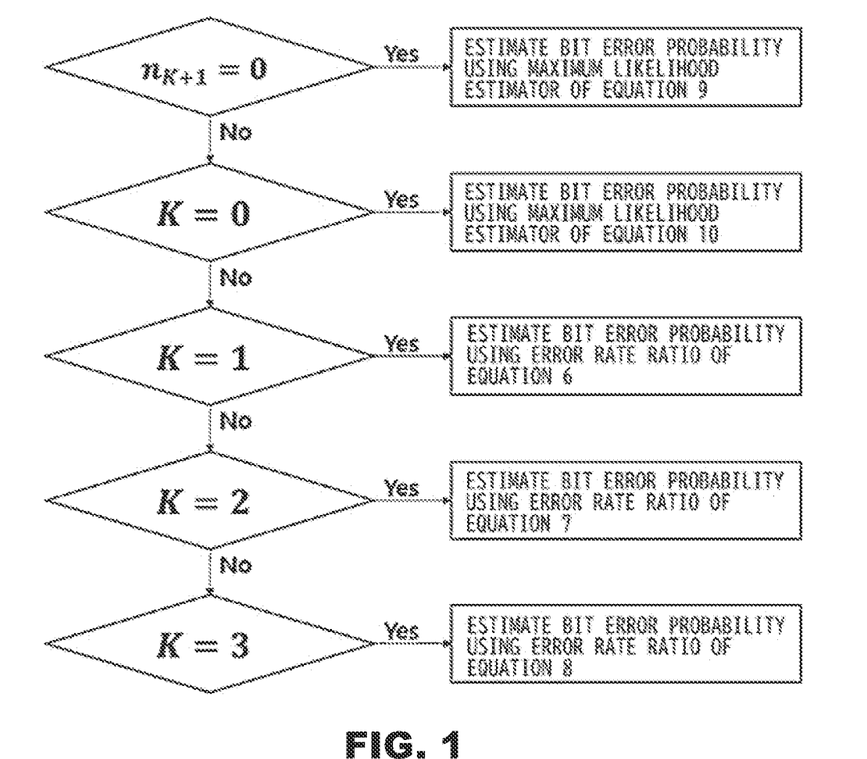
FIG. 1 is a flowchart of a method for estimating a bit error probability using an error rate ratio of a frame synchronization word according to an embodiment of the present invention.

FIG. 1 is a flowchart of a method for estimating a bit error probability using an error rate ratio of a frame synchronization word according to an embodiment of the present invention. The present invention may be implemented by a kind of data processing device, and the data processing device may set K, which denotes a bit error allowable tolerance of a frame synchronization word having a length of M bits. The data processing device performs frame synchronization to figure out the numbers $n_0, \ldots n_K$ of frames of which frame synchronization words each have 0 bit error, . . . , and K bit errors, among received N frames. In addition, the data processing device figure outs the number $n_{K+1}$ of frames each having a frame synchronization word in which the number of bit errors exceeds K, and $n_0+n_1 \ldots +n_{K+1}=N$.

The method for estimating a bit error probability using an error rate ratio of a frame synchronization word according to an embodiment of the present invention may include steps a), b), c), and d).

In step a), the error rate ratios, $\zeta_0, \zeta_1, \ldots, \zeta_{K-1}$ synchronization words are defined as shown in the following Equation 1:

$$\zeta_k = \frac{n_{k+1}}{n_k} \quad \text{[Equation 1]}$$

(where $n_k$ denotes the number of frames each having a frame synchronization word in which the number of bit errors is k, and K denotes a bit error allowable tolerance of a frame synchronization word having a length of M bits).

In step b), a weighted least squares (WLS) cost function with weights greater than or equal to 0 for the bit error probability is set using the error rate ratios set in step a). More specifically, in step b), the WLS cost function $f(p_e)$ with the weights $w_0, \ldots,$ and $w_{k-1}$ as shown in the following Equation 4 is set using the error rate ratios set through the above-described Equation 1:

$$f(p_e) = \sum_{k=0}^{K-1} w_k \times \left(\frac{\zeta_k}{c_k} - \gamma\right)^2 \quad \text{[Equation 4]}$$

(where a constant $c_k$ is defined by the following Equation 3-2, and $\gamma$ is defined by the following Equation 3-3), $$c_k = \frac{M-k}{k+1} \quad \text{[Equation 3-2]}$$

$$\gamma = \frac{p_e}{1-p_e}, \quad \text{[Equation 3-3]}$$

$$p_e = \frac{\gamma}{1+\gamma}.$$

In step c), an estimated bit error probability value that minimizes the cost function set in step b) is obtained. More specifically, in step c), values of $\gamma$ and $p_e$ that minimize the cost function $f(p_e)$ are obtained through the following Equations 5-1 and 5-2:

$$\hat{\gamma} = \frac{\sum_{k=0}^{K-1} w_k \zeta_k / c_k}{\sum_{k=0}^{K-1} w_k} \quad \text{[Equation 5-1]}$$

(where $\hat{\gamma}$ denotes an estimated value of the value of $\gamma$ that minimizes $f(p_e)$ of the above-described Equation 4), $$\hat{p_e} = \frac{\hat{\gamma}}{\hat{\gamma}+1} = \frac{\sum_{k=0}^{K-1} w_k \zeta_k / c_k}{\sum_{k=0}^{K-1} w_k \zeta_k / c_k + w_k}. \quad \text{[Equation 5-2]}$$

Here, Equation 5-2 may be derived through Equation 3-3 and Equation 5-1.

In step d), the weights $w_0, \ldots, w_{K-1}$ and are sequentially obtained so that the mean squared error of $\hat{p}_e$ e becomes small. More specifically, in step d), the bit error probability is estimated in a different manner depending on a value of K, which denotes a bit error allowable tolerance of a frame synchronization word, while $w_0$ is set to 1. This is because $\hat{p}_e$ of the above-described Equation 5-2 does not change even if the weights $w_0, \ldots, w_{K-1}$ are multiplied by any positive number in common, and thus, does not lose generality.

Then, a method for estimating a bit error probability according to a value of K, which denotes a bit error allowable tolerance of a frame synchronization word, will be described in detail below. First, when a value of $n_{K+1}$ which denotes the number of frames each having a frame synchronization word in which the number of bit errors exceeds the allowable tolerance K, is 0, an estimated bit error probability value $\hat{p}_e$ is obtained according to Equation e for a maximum likelihood estimator described above in the section [Background Art] through the following Equation 9:

$$\hat{p_e} = \frac{\sum_{k=1}^{K} k \times n_k}{M \times N}. \quad \text{[Equation 9]}$$

When the value of $n_{K+1}$ is not 0, and the value of K, which denotes a bit error allowable tolerance of a frame synchronization word, is 0, an estimated bit error probability value $\hat{p}_e$ is obtained according to Equation f for a maximum likelihood estimator described above in the section [Background Art] through the following Equation 10:

$$\hat{p}_e = 1 - (n_0/N)^{1/M} \quad \text{[Equation 10]}$$

When the value of K, which denotes an allowable error tolerance, is set to a value greater than 0 in order to improve the synchronizing performance of the data processing device, and the value of $n_{K+1}$ is not 0, a maximum likelihood estimator is not given mathematically and it is required to obtain an estimated value through numerical analysis as described in the section [Background Art]. In this case, an estimated bit error probability value $\hat{p}_e$ is obtained through simple computation using error rate ratios of frame synchronization words. The estimated bit error probability value $\hat{p}_e$ is calculated in a different manner depending on the value of K, which denotes an allowable error tolerance of the frame synchronization word.

In addition, in step d), when the value of $n_{K+1}$ is not 0 and the value of K is 1, a constant $c_0$ and an error rate ratio $\zeta_0 = n_1/n_0$ of a frame synchronization word are calculated, and an estimated bit error probability value $\hat{p}_e$ is obtained through the following Equation 6:

$$c_0 = M, \zeta_0 = n_1/n_0$$
$$\hat{\gamma}_0 = \zeta_0/c_0, \hat{p}_e = \hat{\gamma}_0/(\hat{\gamma}_0 + 1).$$

In step d), when the value of $n_{K+1}$ is not 0 and the value of K is 2, constants $c_0$ and $c_1$ and error rate ratios $\zeta_0 = n_1/n_0$ and $\zeta_1 = n_2/n_1$ of frame synchronization words are calculated, and an estimated bit error probability value $\hat{p}_e$ is obtained through the above-described Equation 7:

$$c_0 = M, \quad \text{[Equation 7]}$$
$$c_1 = (M-1)/2,$$
$$\zeta_0 = n_1/n_0,$$
$$\zeta_1 = n_2/n_1,$$
$$\hat{\gamma}_{1_a} = \zeta_0/c_0,$$
$$\hat{w}_1 = \frac{c_1 \hat{\gamma}_{1_a}(c_0 \hat{\gamma}_{1_a} + 2)}{2c_1 \hat{\gamma}_{1_a} + 1},$$
$$\hat{\gamma}_1 = \frac{\zeta_0/c_0 + \hat{w}_1 \zeta_1/c_1}{1 + \hat{w}_1},$$
$$\hat{p}_e = \hat{\gamma}_1/(\hat{\gamma}_1 + 1)$$

(where, when the number $n_1$ of frames of which frame synchronization words each have 1 bit error is 0, the error rate ratio $$\zeta_1 = \frac{n_2}{n_1}$$

is not defined, and the weight $\hat{w}_1$ is set to 0 and $\hat{w}_1 \zeta_1/c_1$ is calculated as 0 in the above-described Equation 7).

In step d), when the value of $n_{K+1}$ is not 0 and the value of K is 3, constants $c_0$, $c_1$, and $c_2$, and error rate ratios $\zeta_0 = n_1/n_0$, $\zeta_1 = n_2/n_2$, and $\zeta_2 = n_3/n_2$ of frame synchronization words are calculated, and an estimated bit error probability value $\hat{p}_e$ is obtained through the above-described Equation 8:

$$c_0 = M, \quad \text{[Equation 8]}$$
$$c_1 = (M-1)/2,$$
$$c_2 = (M-2)/3,$$
$$\zeta_0 = n_1/n_0,$$
$$\zeta_1 = n_2/n_1,$$
$$\zeta_2 = n_3/n_2$$
$$\hat{\gamma}_{1_a} = \zeta_0/c_0,$$
$$\hat{w}_1 = \frac{c_1 \hat{\gamma}_{1_a}(c_0 \hat{\gamma}_{1_a} + 2)}{2c_1 \hat{\gamma}_{1_a} + 1},$$
$$\hat{\gamma}_1 = \frac{\zeta_0/c_0 + \hat{w}_1 \zeta_1/c_1}{1 + \hat{w}_1},$$
$$\hat{\gamma}_1 = \frac{\zeta_0/c_0 + \hat{w}_1 \zeta_1/c_1}{1 + \hat{w}_1},$$
$$\hat{w}_2 = \frac{c_2 \hat{\gamma}_1 \{c_0 c_1 \hat{\gamma}_1^2 + c_1 \hat{\gamma}_1 (1 - \hat{w}_1)^2 + 2\hat{w}_1^2 + \hat{w}_1\}}{(c_2 \hat{\gamma}_1 + 1) + (2c_2 \hat{\gamma}_1 + 1)\hat{w}_1},$$
$$\hat{\gamma}_2 = \frac{\zeta_0/c_0 + \hat{w}_1 \zeta_1/c_1 + \hat{w}_2 \zeta_2/c_2}{1 + \hat{w}_1 + \hat{w}_2},$$
$$\hat{p}_e = \hat{\gamma}_2/(\hat{\gamma}_2 + 1)$$

(where, when the number $n_1$ of frames of which frame synchronization words each have 1 bit error is 0, the error rate ratio $$\zeta_1 = \frac{n_2}{n_1}$$

is not defined, and the weight $\hat{w}_1$ is set to 0 and $\hat{w}_1 \zeta_1/c_1$ is calculated as 0 in the above-described Equation 8, and when the number $n_2$ of frames of which frame synchronization words each have 2 bit errors is 0, the error rate ratio $$\zeta_2 = \frac{n_3}{n_2}$$

is not defined, and the weight $\hat{w}_2$ is set to 0 and $\hat{w}_2 \zeta_2/c_2$ is calculated as 0 in the above-described Equation 8).

It is known in aeronautical telemetry that there are many cases where K is 2. Although a case where K is 4 or more is not described herein because there are hardly cases where K is 4 or more in aeronautical telemetry, the scope of the present invention can also be extended to the case where K is 4 or more.

The mean squared error performance of the estimator can be confirmed through Monte-Carlo simulation. In the simulation, a bit string length M of a frame synchronization word is 24 and the total number N of frames received by the data processing device is $10^5$. The simulator may figure out the numbers $n_0, \ldots n_K$ of frames of which frame synchronization words each have 0 bit error, ..., and K bit errors. Also, the simulator may figure out the number $n_0, \ldots n_{K+1}$ of frames each having a frame synchronization word in which the number of bit errors exceeds K.

Figure 2:
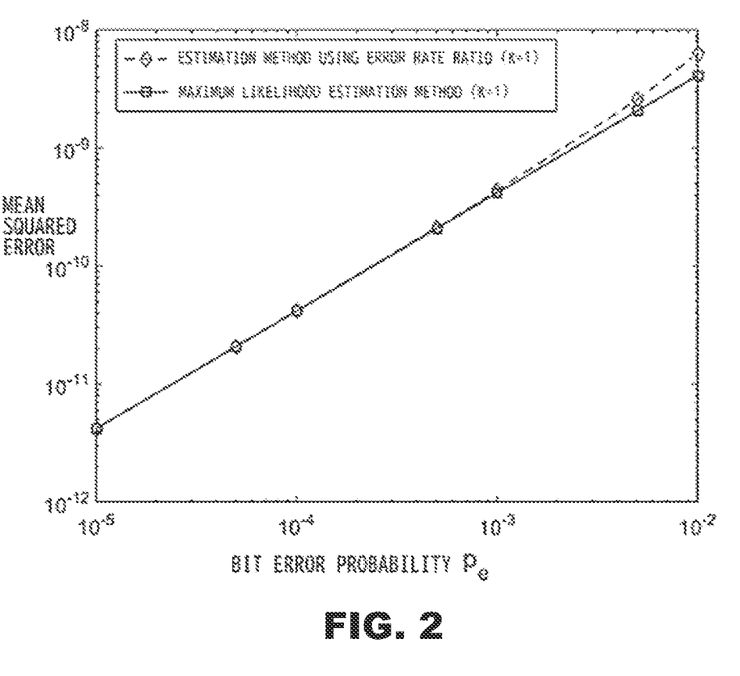
FIG. 2 is a graph showing a mean squared error obtained by an estimator according to the above-described Equation 6 using an error rate ratio $\zeta_0 = n_1/n_0$ and a mean squared error obtained by a maximum likelihood estimation method, when K, which denotes a bit error allowable tolerance of a frame synchronization word, is 1.

FIG. 2 shows a mean squared error obtained by the estimator according to the above-described Equation 6 using an error rate ratio $\zeta_0 = n_1/n_0$ and a mean squared error obtained by the maximum likelihood estimation method, when K, which denotes a bit error allowable tolerance of a frame synchronization word, is 1. Here, the mean squared error is calculated according to the above-described Equation d. When $n_2$ is 0, an estimated value is obtained according to the above-described Equation 9 in the maximum likelihood estimation method. When $n_2$ is not 0, a value at which the likelihood function of the above-described Equation c becomes maximum is found through numerical analysis in the maximum likelihood estimation method.

Figure 3:
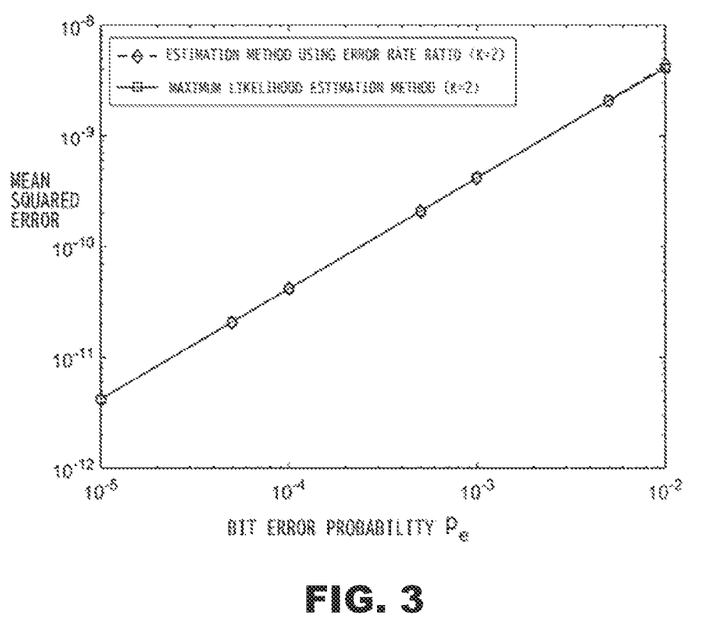
FIG. 3 is a graph showing a mean squared error obtained by an estimator according to the above-described Equation 7 using error rate ratios $\zeta_0=n_1/n_0$ and $\zeta_1=n_2/n_1$ and a mean squared error obtained by a maximum likelihood estimation method, when K, which denotes a bit error allowable tolerance of a frame synchronization word, is 2.

FIG. 3 shows a mean squared error obtained by the estimator according to the above-described Equation 7 using error rate ratios $\zeta_0 = n_1/n_0$ and $\zeta_1 = n_2/n_1$ and a mean squared error obtained by the maximum likelihood estimation method, when K, which denotes a bit error allowable tolerance of a frame synchronization word, is 2. When $n_3$ is 0, an estimated value is obtained according to the above-described Equation 9 in the maximum likelihood estimation method. When $n_3$ is not 0, a value at which the likelihood function of the above-described Equation c becomes maximum is found through numerical analysis in the maximum likelihood estimation method.

Figure 4:
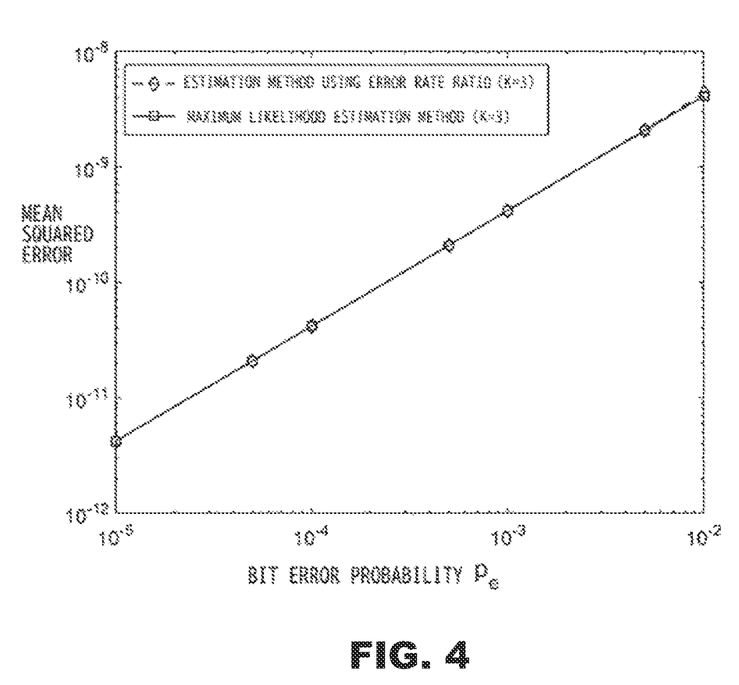
FIG. 4 is a graph showing a mean squared error obtained by an estimator according to the above-described Equation 8 using error rate ratios $\zeta_0=n_1/n_0$, and $\zeta_1=n_2/n_1$, and a mean squared error obtained by a maximum likelihood estimation method, when K, which denotes a bit error allowable tolerance of a frame synchronization word, is 3.

FIG. 4 shows a mean squared error obtained by the estimator according to the above-described Equation 8 using error rate ratios $\zeta_0 = n_1/n_0$, $\zeta_1 = n_2/n_1$, and $\zeta_2 = n_3/n_2$, and a mean squared error obtained by the maximum likelihood estimation method, when K, which denotes a bit error allowable tolerance of a frame synchronization word, is 3. When $n_4$ is 0, an estimated value is obtained according to the above-described Equation 9 in the maximum likelihood estimation method. When $n_4$ is not 0, a value at which the likelihood function of the above-described Equation c becomes maximum is found through numerical analysis in the maximum likelihood estimation method.

Through FIGS. 2, 3, and 4, it can be confirmed that, when the value of K, which denotes a bit error allowable tolerance of a frame synchronization word, is 1, 2, or 3, there is no great difference between the mean squared error obtained by the conventionally used maximum likelihood estimator and the mean squared error obtained by the estimator using the error rate ratio.

The present invention is not limited to the above-described embodiment, and may be applied in a wide range. Various modifications may be made by any person having ordinary knowledge in the art to which the present invention pertains without departing from the gist of the present invention claimed in the claims.

The invention claimed is:

1. A method for estimating a bit error probability using an error rate ratio of a frame synchronization word included in a header of a unit frame generated by a telemetry encoder, the method comprising the steps of:

a) defining error rate ratios $\zeta_0, \zeta_1, \ldots,$ and $\zeta_{K-1}$ of frame synchronization words included in headers of unit frames generated by a telemetry encoder as shown in the following Equation 1:

$$\zeta_k = \frac{n_{k+1}}{n_k}, \qquad \text{[Equation 1]}$$

where $n_k$ denotes a number of frames each having a frame synchronization word in which a number of bit errors is k, and K denotes a bit error allowable tolerance of a frame synchronization word having a length of M bits;

b) setting a cost function $f(p_e)$ in a weighted least squares (WLS) form, with weights $w_0, \ldots,$ and $w_{K-1}$ greater than or equal to 0, as shown in the following Equation 4, using the error rate ratios of the frame synchronization words defined in the step a):

$$f(p_e) = \sum_{k=0}^{K-1} w_k \times \left(\frac{\zeta_k}{c_k} - \gamma\right)^2 \qquad \text{[Equation 4]}$$

where a constant $c_k$ is defined by the following Equation 3-2, and $\gamma$ and a bit error probability $p_e$ are defined by the following Equation 3-3, $$c_k = \frac{M-k}{k+1} \qquad \text{[Equation 3-2]}$$

$$\gamma = \frac{p_e}{1 - p_e}, \qquad \text{[Equation 3-3]}$$

$$p_e = \frac{\gamma}{1 + \gamma};$$

c) obtaining a value of $\gamma$ through the following Equation 5-1, the value of $\gamma$ minimizing the cost function $f(p_e)$ of Equation 4 set in the step b):

$$\hat{\gamma} = \frac{\sum_{k=0}^{K-1} w_k \zeta_k / c_k}{\sum_{k=0}^{K-1} w_k} \qquad \text{[Equation 5-1]}$$

where $\hat{\gamma}$ denotes an estimated value of the value of $\gamma$; and d) deriving an estimated bit error probability value $\widehat{p_e}$ corresponding to $\hat{\gamma}$ using Equation 3-3 and Equation 5-1 through the following Equation 5-2, and sequentially obtaining the weights $w_0, \ldots,$ and $w_{K-1}$ such that a mean squared error of the estimated bit error probability value $\widehat{p_e}$ decreases:

$$\widehat{p_e} = \frac{\hat{\gamma}}{\hat{\gamma} + 1} = \frac{\sum_{k=0}^{K-1} w_k \zeta_k / c_k}{\sum_{k=0}^{K-1} w_k \zeta_k / c_k + w_k}. \qquad \text{[Equation 5-2]}$$

2. The method of claim 1, wherein in the step d), $w_0$ is set to 1.

3. The method of claim 2, wherein in the step d), when a value of $n_{K+1}$, which denotes the number of frames each including a frame synchronization word in which the number of bit errors exceeds K, which denotes a bit error allowable tolerance for the frame synchronization word, is not 0, and a value of the bit error allowable tolerance K is 1, the estimated bit error probability value $\widehat{p}_e$ is obtained through the following Equation 6:

$$c_0 = M, \zeta_0 = n_1/n_0 \quad \text{[Equation 6]}$$

$$\widehat{\gamma}_{r_a} = \zeta_0/c_0, \widehat{p}_e = \widehat{\gamma}_{r_a}/(\widehat{\gamma}_{r_a}+1).$$

4. The method of claim 2, wherein in the step d), when a value of $n_{K+1}$, which denotes the number of frames each including a frame synchronization word in which the number of bit errors exceeds K, which denotes a bit error allowable tolerance for the frame synchronization word, is not 0, and a value of the bit error allowable tolerance K is 2, the estimated bit error probability value $\widehat{p}_e$ is obtained through the following Equation 7:

$$c_0 = M, \quad \text{[Equation 7]}$$
$$c_1 = (M-1)/2,$$
$$\zeta_0 = n_1/n_0,$$
$$\zeta_1 = n_2/n_1$$
$$\widehat{\gamma}_{r_a} = \zeta_0/c_0,$$
$$\widehat{w}_1 = \frac{c_{1\widehat{\gamma}_{r_a}}(c_0\widehat{\gamma}_{r_a}+2)}{2c_{1\widehat{\gamma}_{r_a}}+1}$$
$$\widehat{\gamma}_1 = \frac{\zeta_0/c_0 + \widehat{w}_1\zeta_1/c_1}{1+\widehat{w}_1},$$
$$\widehat{p}_e = \widehat{\gamma}_1/(\widehat{\gamma}_1+1)$$

where, when the number $n_1$ of frames each including a frame synchronization word in which the number of bit errors is 1 is 0, the error rate ratio $$\zeta_1 = \frac{n_2}{n_1}$$

is not defined, and the weight $\widehat{w}_1$ is set to 0 and $\widehat{w}_1\zeta_1/c_1$ is calculated as 0 in Equation 7.

5. The method of claim 2, wherein in the step d), when a value of $n_{K+1}$, which denotes the number of frames each including a frame synchronization word in which the number of bit errors exceeds K, which denotes a bit error allowable tolerance for the frame synchronization word, is not 0, and a value of the bit error allowable tolerance K is 3, the estimated bit error probability value $\widehat{p}_e$ is obtained through the following Equation 8:

$$c_0 = M, \quad \text{[Equation 8]}$$
$$c_1 = (M-1)/2,$$
$$c_2 = (M-2)/3,$$
$$\zeta_0 = n_1/n_0,$$
$$\zeta_1 = n_2/n_1,$$
$$\zeta_2 = n_3/n_2$$
$$\widehat{\gamma}_{r_a} = \zeta_0/c_0,$$
$$\widehat{w}_1 = \frac{c_{1\widehat{\gamma}_{r_a}}(c_0\widehat{\gamma}_{r_a}+2)}{2c_{1\widehat{\gamma}_{r_a}}+1}$$
$$\widehat{\gamma}_1 = \frac{\zeta_0/c_0 + \widehat{w}_1\zeta_1/c_1}{1+\widehat{w}_1},$$
$$\widehat{w}_2 = \frac{c_{2\widehat{\gamma}_1}\{c_0 c_{1\widehat{\gamma}_1}^2 + c_{1\widehat{\gamma}_1}(1-\widehat{w}_1)^2 + 2\widehat{w}_1^2 + \widehat{w}_1\}}{(c_{2\widehat{\gamma}_1}+1)+(2c_{2\widehat{\gamma}_1}+1)\widehat{w}_1}$$
$$\widehat{\gamma}_2 = \frac{\zeta_0/c_0 + \widehat{w}_1\zeta_1/c_1 + \widehat{w}_2\zeta_2/c_2}{1+\widehat{w}_1+\widehat{w}_2},$$
$$\widehat{p}_e = \widehat{\gamma}_2/(\widehat{\gamma}_2+1)$$

where, when the number $n_1$ of frames each including a frame synchronization word in which the number of bit errors is 1 is 0, the error rate ratio $$\zeta_1 = \frac{n_2}{n_1}$$

is not defined, and the weight $\widehat{w}_1$ is set to 0 and $\widehat{w}_1\zeta_1/c_1$ is calculated as 0 in the Equation 8, and where, when the number $n_2$ of frames each including a frame synchronization word in which the number of bit errors is 2 is 0, the error rate ratio $$\zeta_2 = \frac{n_3}{n_2}$$

is not defined, and the weight $\widehat{w}_1$ is set to 0 and $\widehat{w}_1\zeta_2/c_2$ is calculated as 0 in Equation 8.

* * * * *